US007032221B1

(12) United States Patent
Chapman et al.

(10) Patent No.: US 7,032,221 B1
(45) Date of Patent: Apr. 18, 2006

(54) MAPPING A STACK IN A STACK MACHINE ENVIRONMENT

(75) Inventors: Graham Chapman, Nepean (CA); John Duimovich, Ottawa (CA); Trent Gray-Donald, Ottawa (CA); Graeme Johnson, Ottawa (CA); Andrew Low, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,558

(22) Filed: Jun. 10, 1999

(30) Foreign Application Priority Data

Jun. 29, 1998 (CA) .................................. 2241865

(51) Int. Cl.
*G06F 9/46* (2006.01)
*G06F 12/00* (2006.01)

(52) U.S. Cl. ...................................... 718/100; 711/202

(58) Field of Classification Search ................ 709/100, 709/104; 717/131, 148, 126; 718/1, 100–108; 711/202

See application file for complete search history.

(56) References Cited

U.S. PATENT DOCUMENTS 5,668,999 A * 9/1997 Gosling ...................... 717/126
5,828,883 A * 10/1998 Hall ........................... 717/133
5,909,579 A * 6/1999 Agesen et al. .............. 717/131
6,047,125 A * 4/2000 Agesen et al. .............. 717/148
6,098,089 A * 8/2000 O'Connor et al. .......... 709/104
6,330,659 B1 * 12/2001 Poff et al. ...................... 712/34
6,374,286 B1 * 4/2002 Gee et al. ................... 709/108

OTHER PUBLICATIONS

Ball, Thomas, and Larus, James R. "Efficient Path Profiling", 1996 IEEE, pp. 46-57.*

Jacobson, Quinn, and Rotenberg, Eric, and Smith, James E. "Path-Based Next Trace Prediction", 1997 IEEE, pp. 14-23.*

* cited by examiner

*Primary Examiner*—Meng-Al T. An
*Assistant Examiner*—Kenneth Tang
(74) *Attorney, Agent, or Firm*—Scully, Scott, Murphy & Presser, P.C.; Richard Lau, Esq.

(57) ABSTRACT

The stack mapper of the present invention seeks to determine the shape of the stack at a given program counter. This is accomplished by locating all start points possible for a given method, that is, at all of the entry points for the method and all of the exception entry points, and trying to find a path from the beginning of the method to the program counter in question. The mapper first tries to locate a linear path from the beginning of the method, and then iteratively processes the sequence of bytes at each branch until the destination program counter is reached. Once the path is found, a simulation is run of the stack through that path, which is used as the virtual stack for the purposes of the garbage collector.

19 Claims, 14 Drawing Sheets

MAPPING A STACK IN A STACK MACHINE ENVIRONMENT

BACKGROUND OF THE INVENTION

1. Technical Field

This invention relates generally to the field of memory optimization, and provides, in particular, a method for mapping the dynamic memory stack in a programming language environment such as Java.

2. Prior Art

Java programs (as well as those in other object-oriented or OO languages) require the allocation of dynamic storage from the operating system at run-time. This run-time storage is allocated as two separate areas known as the "heap" and the "stack". The stack is an area of addressable or dynamic memory used during program execution for allocating current data objects and information. Thus, references to data objects and information associated with only one activation within the program are allocated to the stack for the life of the particular activation, Objects (such as classes) containing data that could be accessed over more than one activation must be heap allocated or statically stored for the duration of use during run-time.

Because modern operating systems and hardware platforms make available increasingly large stacks, modern applications have correspondingly grown in size and complexity to take advantage of this available memory. Most applications today use a great deal of dynamic memory. Features such as multitasking and multithreading increase the demands on memory. OO programming languages use dynamic memory much more heavily than comparable serial programming languages like C, often for small, short-lived allocations.

The effective management of dynamic memory, to locate useable free blocks and to deallocate blocks no longer needed in an executing program, has become an important programming consideration. A number of interpreted OO programming languages such as Smalltalk, Java and Lisp employ an implicit form of memory management, often referred to as garbage collection, to designate memory as "free" when it is no longer needed for its current allocation.

Serious problems can arise if garbage collection of an allocated block occurs prematurely. For example, if a garbage collection occurs during processing, there would be no reference to the start of the allocated block and the collector would move the block to the free memory list. If the processor allocates memory, the block may end up being reallocated, destroying the current processing. This could result in a system failure.

A block of memory is implicitly available to be deallocated or returned to the list of free memory whenever there are no references to it. In a runtime environment supporting implicit memory management, a garbage collector usually scans or "walks" the dynamic memory from time to time looking for unreferenced blocks and returning them. The garbage collector starts at locations known to contain references to allocated blocks. These locations are called "roots". The garbage collector examines the roots and when it finds a reference to an allocated block, it marks the block as referenced. If the block was unmarked, it recursively examines the block for references. When all the referenced blocks have been marked, a linear scan of all allocated memory is made and unreferenced blocks are swept into the free memory list. The memory may also be compacted by copying referenced blocks to lower memory locations that were occupied by unreferenced blocks and then updating references to point to the new locations for the allocated blocks.

The assumption that the garbage collector makes when attempting to scavenge or collect garbage is that all stacks are part of the root set of the walk. Thus, the stacks have to be fully described and walkable.

In programming environments like Smalltalk, where there are no type declarations, this is not particularly a problem. Only two different types of items, stack frames and objects, can be added to the stack. The garbage collector can easily distinguish between them and trace references relating to the objects.

However, the Java programming language also permits base types (i.e., integers) to be added to the stack. This greatly complicates matters because a stack walker has to be more aware how to view each stack slot. Base types slots must not be viewed as pointers (references), and must not be followed during a walk.

Further, the content of the stack may not be static, even during a single allocation. As a method runs, the stack is used as a temporary "scratch" space, and an integer might be pushed onto the stack or popped off it, or an object pushed or popped at any time. Therefore, it is important to know during the execution of a program that a particular memory location in the stack contains an integer or an object.

The changing content of a stack slot during method execution can be illustrated with the following simple bytecode sequence of the form:

ICONST 0
POP
NEW
POP
RETURN

As this is run, an integer, zero (0), is pushed onto the top of the stack, then popped so that the stack is empty. Then an object (pointer) is pushed onto the top of the stack, and then popped so that the stack is again empty. Schematically, the stack sequence is:

0
-
OBJECT
-

In this sequence, the constant 0 and the object share the same stack location as the program is running. Realistically, this sequence would never result in a garbage collection. However, in the naive case, if garbage collection did occur just after the integer was pushed onto the stack, the slot should be ignored, not walked, because it contains only an integer, whereas if a garbage collection occurred after the object had been pushed onto the stack, then the slot would have to be walked because it could contain the only reference to the object in the system. In addition, if the object on the stack had been moved to another location by compaction, then its pointer would have to be updated as well.

Thus, the stack walker has to have a scheme in place to determine which elements to walk and which to skip on the stack.

One solution proposed by Sun Microsystems, Inc in its U.S. Pat. No. 5,668,999 for "System and Method for Pre-Verification of Stack Usage in Bytecode Program Loops", is to calculate the stack shapes for all bytecodes prior to program execution, and to store as a "snapshot", the state of a virtual stack paralleling typical stack operations required during the execution of a bytecode program. The virtual stack is used to verify that the stacks do not underflow or overflow. It includes multiple, pre-set entry points, and can be used as a stack map in operations such as implicit memory management.

However, the creation of a virtual stack of the whole program can be costly in terms of processing time and memory allocation, when all that may be required is a stack mapping up to a specific program counter (PC) in the stack, for a garbage collector to operate a limited number of times during program execution.

SUMMARY OF THE INVENTION

It is therefore an object of the present invention to provide mapping for any PC location on the stack. Then, if a garbage collection occurs, the shape of the stack can be determined for that part of the stack frame.

It is also an object of the present invention to provide a method for mapping the shape of a portion of the stack for use either statically, at method compilation, or dynamically, at runtime.

A further object of the invention is to provide memory optimizing stack mapping.

The stack mapper of the present invention seeks to determine the shape of the stack at a given PC. This is accomplished by locating all start points possible for a given method, that is, at all of the entry points for the method and all of the exception entry points, and trying to find a path from the beginning of the method to the PC in question. Once the path is found, a simulation is run of the stack through that path, which is used as the virtual stack for the purposes of the garbage collector. Accordingly, the present invention provides a method for mapping a valid stack up to a destination program counter through mapping a path of control flow on the stack from any start point in a selected method to the destination program counter and simulating stack actions for executing bytecodes along said path. In order to map a path of control flow on the stack, bytecode sequences are processed linearly until the control flow is interrupted. As each bytecode sequence is processed, unprocessed targets from any branches in the sequence are recorded for future processing. The processing is repeated interactively, starting from the beginning of the method and then from each branch target until the destination program counter has been processed. Preferably a virtual stack is generated from the simulation, which is encoded and stored on either the stack or the heap.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

"The Java Virtual Machine Specification" details the set of operations that a Java virtual machine must perform, and the associated stack actions. Not included in the Java specification are some more stringent requirements about code flow. These are specified in the bytecode verifier (discussed in detail in Sun's U.S. Pat. No. 5,668,999, referenced above). Code sequences that allow for different stack shapes at a given PC are not allowed because they are not verifiable. Sequences that cause the stack to grow without bound are a good example.

Thus, the following code is not legal:

```
x: ICONST1
   GOTO x
```

because it creates an infinite loop and a never-ending stack.

The present invention is described in the context of a Java programming environment. It can also apply to any environment that prohibits the use of illegal stack statements in a manner similar to that provided by the Java bytecode verifier.

The shape of the stack is determined by the control flows, the path or paths, within the method for which the stack frame was or will be constructed. Therefore, in the method of the present invention, a path from any start point of the method to a selected PC is located, and then the stack actions for the bytecodes along the path are simulated. The implementation of this method in the preferred embodiment is illustrated in more detail in the flow diagrams of FIGS. 1A and 1B, and discussed below.

Figure 2:
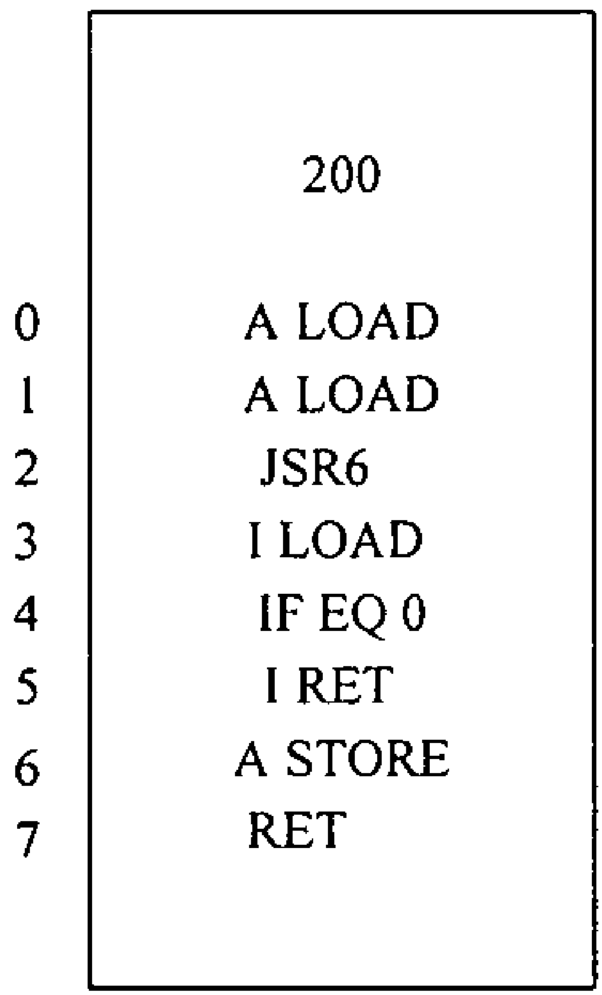
FIG. 2 is a schematic diagram of a sample segment of stack slots for illustrating the method of operation of the invention.

FIG. 2 is a sample of stack layout 200 for a method, to illustrate the preferred embodiment. (In the example, "JSR" refers to a jump to a subroutine, a branch with a return, and "IF EQ 0" is a comparison of the top of the stack against zero.) A linear scanning of these PCs as they are laid out in memory, starting at the beginning of the method and walking forward to a selected destination, such as PC 7, is not appropriate. The linear scan would omit the jump at PC 2 to the subroutine at PC 6, resulting in a break in the stack model without knowledge of how to arrive at the selected PC.

Returning to FIG. 1A, the input to the method of the invention is the destination PC for the method and the storage area destination to which the resulting information on the stack shape will be written (block 100). When the mapping occurs at runtime, the definition of the storage destination will point to a location on the stack; when the mapping occurs at compile time, the pointer will be into an array for storage with the compiled method on the heap. The different uses of the invention for stack mapping at runtime and at compilation are discussed in greater detail below.

Memory for three tables, a seen list, a branch map table and a to be walked list, are allocated and the tables are initialized in memory (block 102). In the preferred embodiment, the memory requirement for the tables is sized in the following manner. For the seen list, one bit is reserved for each PC. This is determined by looking at the size of the bytecode array and reserving one bit for each bytecode. Similarly, two longs are allocated for each bytecode or PC in both the to be walked list and the branch map table. The bit vector format provides a fast implementation.

The three tables are illustrated schematically in FIG. 3 for the code sequence given in FIG. 2: FIG. 3A shows the state of these tables at the beginning of the stack mapper's walk; FIGS. 3B through 3I show the varying states of these tables as the stack mapper walks this code sequence.

The seen list is used in the first pass of the stack mapper to identify bytes which have already been walked, to avoid entering an infinite loop. At the beginning of the walk, no bytes in the given sequence are identified as having been seen. The to be walked list provides a list of all known entry points to the method. At the beginning of the stack mapper's walk, the to be walked list contains the entry point to the method at byte zero (0) and every exception handler address for the selected method. The branch map is initially empty.

Figure 1A:
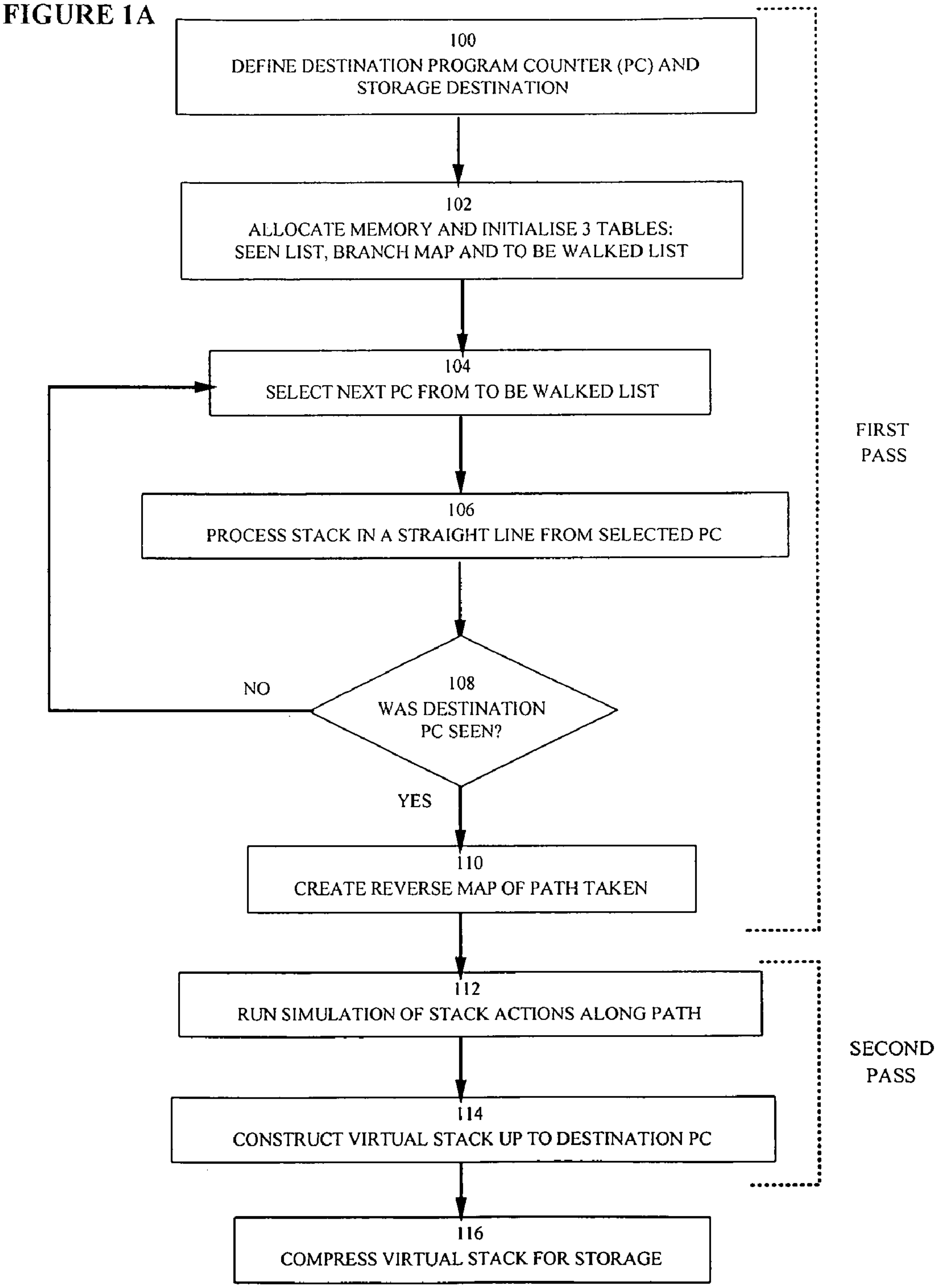
FIG. 1A is a flow diagram outlining the steps taken by the stack mapper according to the present invention to map the shape of the stack to a given program counter during two passes.
Figure 1B:
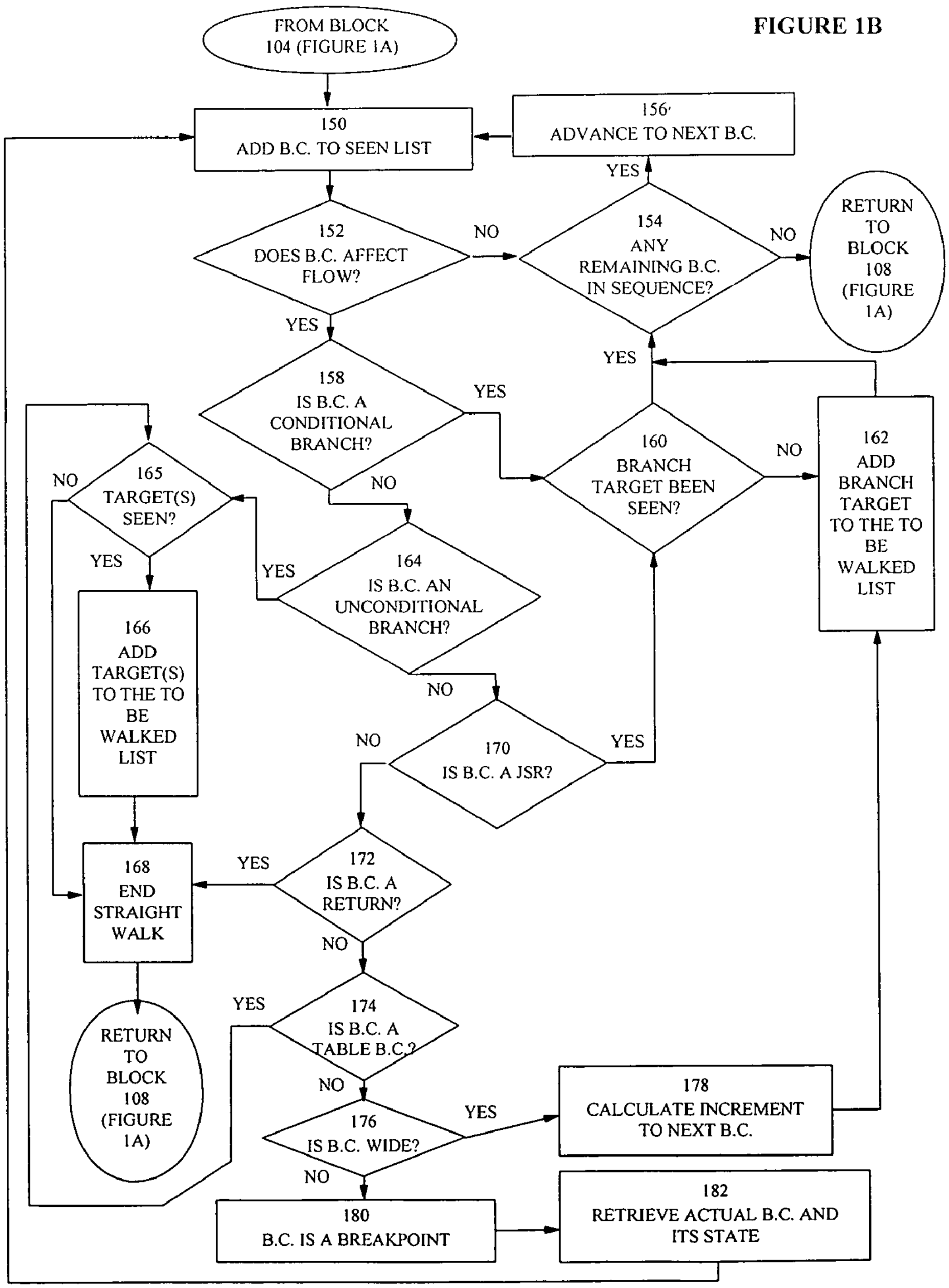
FIG. 1B is a flow diagram, similar to FIG. 1A, illustrating the processing of a bytecode sequence at one point in the method of FIG. 1A.

Once these data structures are initialized, the first element from the to be walked list is selected (block 104) and the sequence of bytecodes is processed (block 106) in a straight line according to the following criteria or states and as illustrated in the flow diagram of FIG. 1B. As each bytecode is selected for processing, it is added to the seen list (block 150). The actions taken in processing the bytecode are determined by the state that defines it:

- state 0: flow unaffected (block 152), advance to next bytecode, if any (blocks 154, 156)
- state 1: branch conditional (block 158), if branch target has not yet been seen (block 160), then add it to the to be walked list (block 162), and in any event, advance to next bytecode, if any (blocks 154, 156)
- state 2: branch unconditional (block 164), if the branch target has not yet been seen (block 165), add it to the to be walked list (block 166) and end the straight walk (block 168)
- state 3: jump to subroutine (JSR) (block 170), if branch target has not yet been seen (block 160), the add it to the to be walked list (block 162), and in any event, advance to the next bytecode, if any (blocks 154, 156)
- state 4: return (block 172) ends the straight walk (block 168)
- state 5: table bytecode (block 174), if branch targets have not yet been seen (block 165), then add them to the to be walked list (block 166), and end the straight walk (block 168)
- state 6: wide bytecode (block 176), calculate size of bytecode to determine increment to next bytecode (block 178) and advance to next bytecode, if any (blocks 154, 156)
- state 7: breakpoint bytecode (block 180), retrieve the actual bytecode and its state (block 182), and then process the actual bytecode (starting at block 150)

State 0 defines a byte that does not cause a branch or any control flow change. For example, in the sample sequence of FIG. 2, A LOAD does not affect the flow and would be processed as state 0.

A conditional branch (state 1) has two states; it can either fall through or go to destination. As the stack mapper processes a conditional branch, it assumes a fall through state, but adds the branch target to the to be walked list in order to process both sides of the branch. FIG. 2 contains a conditional branch at bytes 4, 5. However, if a branch target has already been walked (according to the seen list), then the target is not added (block 156 in FIG. 1B).

A JSR is a language construct used in languages like Java. It is similar to an unconditional branch, except that it includes a return, similar to a function call. It is treated in the same way as a conditional branch by the stack mapper. FIG. 2 contains a JSR to byte 6 at byte 2.

Table bytecodes includes lookup tables and table switches (containing multiple comparisons and multiple branch targets). These are treated as an unconditional branch with multiple branches or targets; any targets not previously seen according to the seen list are added to the to be seen list.

Temporary fetch and store instructions are normally one or two bytes long. One byte is for the bytecode and one byte is for the parameter unless it is inferred by the bytecode. However, Java includes an escape sequence which sets the parameters for the following bytecode as larger than normal (wide bytecode). This affects the stack mapper only in how much the walk count is incremented for the next byte. It does not affect control.

Breakpoints are used for debugging purposes. The breakpoint has overlaid the actual bytecode in the sequence, so is replaced again by the actual bytecode. Processing of the bytecodes in the sequence continues until terminated (eg., by an unconditional branch or a return), or when there are no more bytecodes in the sequence. Returning to FIG. 1A, if the selected PC was not seen during the walk because it is not found on the seen list (block 108), the next element on the to be walked list is selected (block 104) and the bytecode sequence from it processed (block 106) following the same steps in FIG. 1B until the selected PC has been walked (block 108 in FIG. 1A).

Figure 3A:
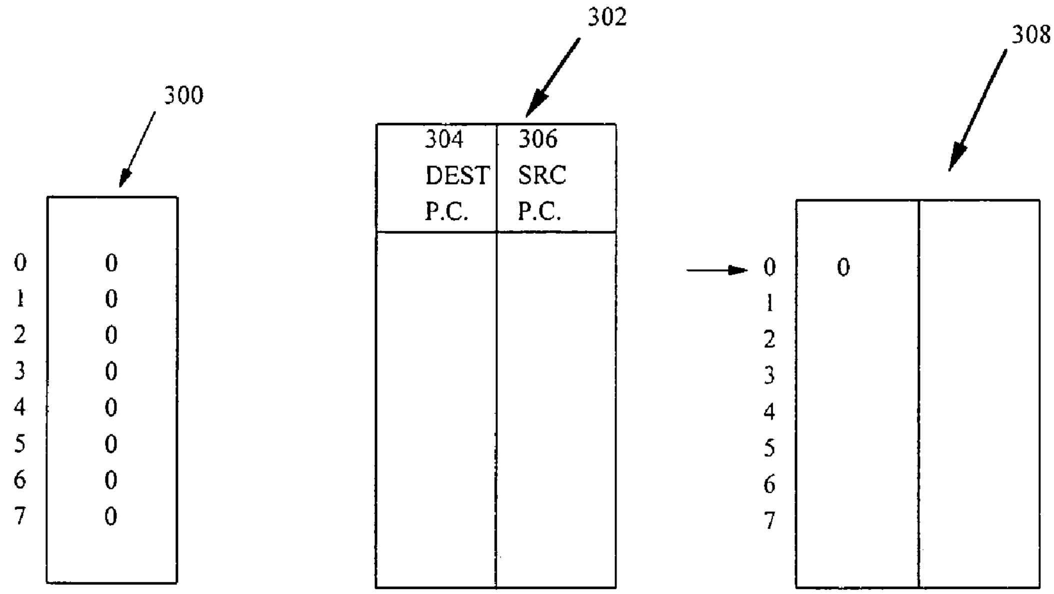
FIG. 3, consisting of FIGS. 3A through 3I, is a schematic illustration of the changes in three tables in memory used to track the processing of the individual program counters during the mapping of the sample segment of FIG. 2, according to the preferred embodiment of the invention.
Figure 3B:
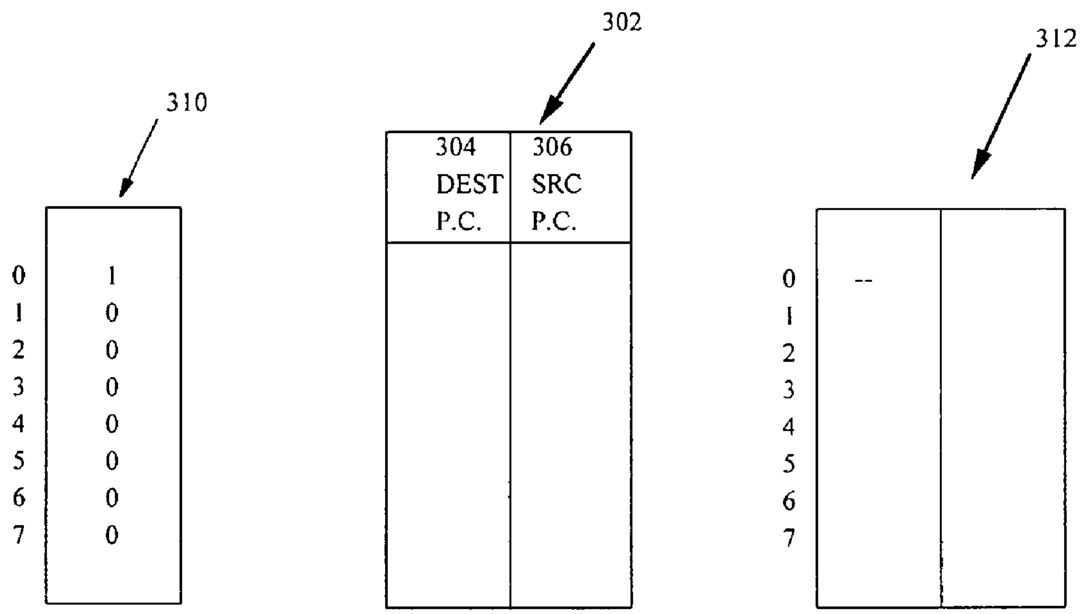
Figure 3C:
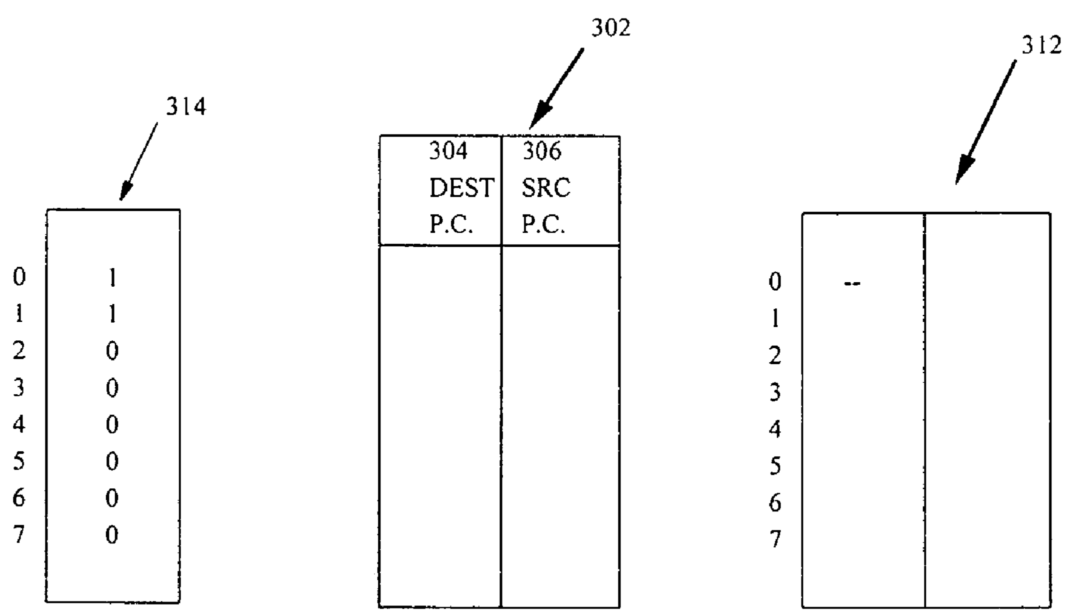
Figure 3D:
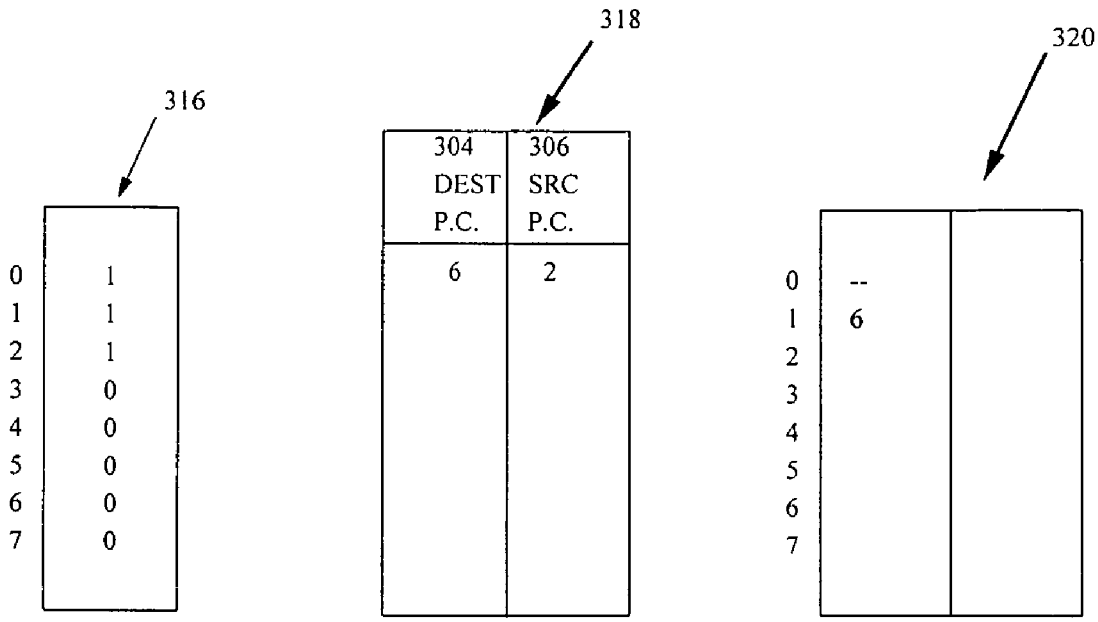
Figure 3E:
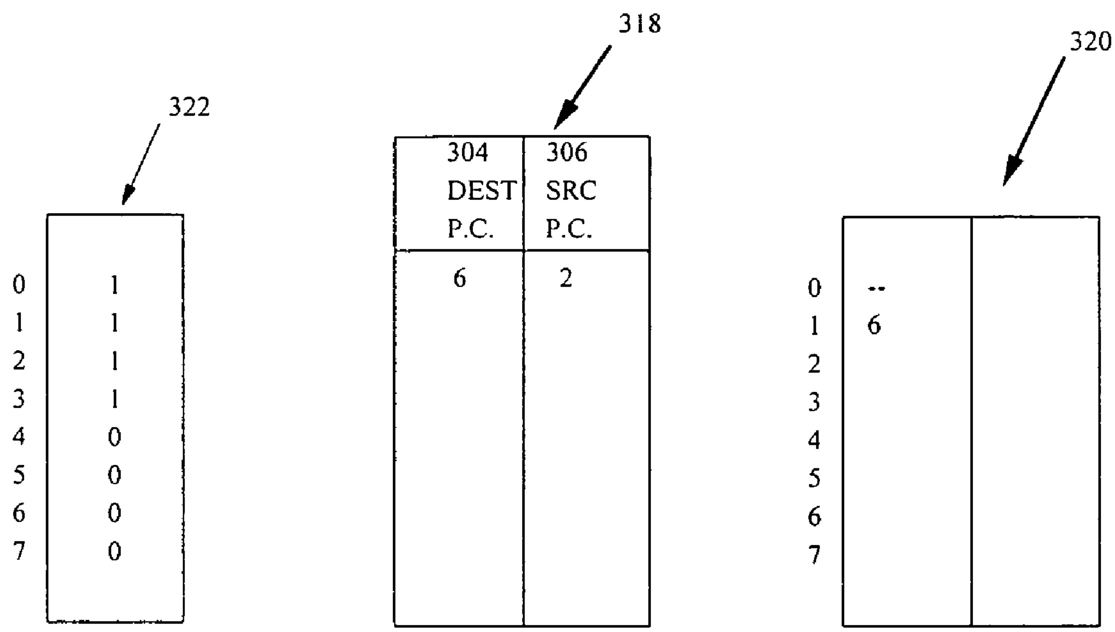
Figure 3F:
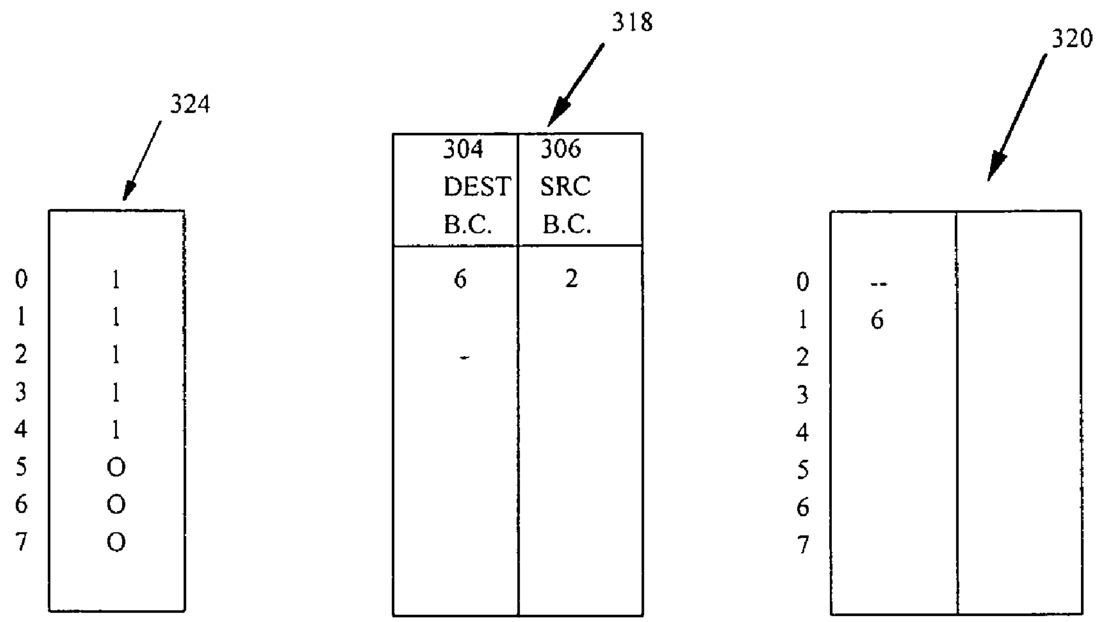
Figure 3G:
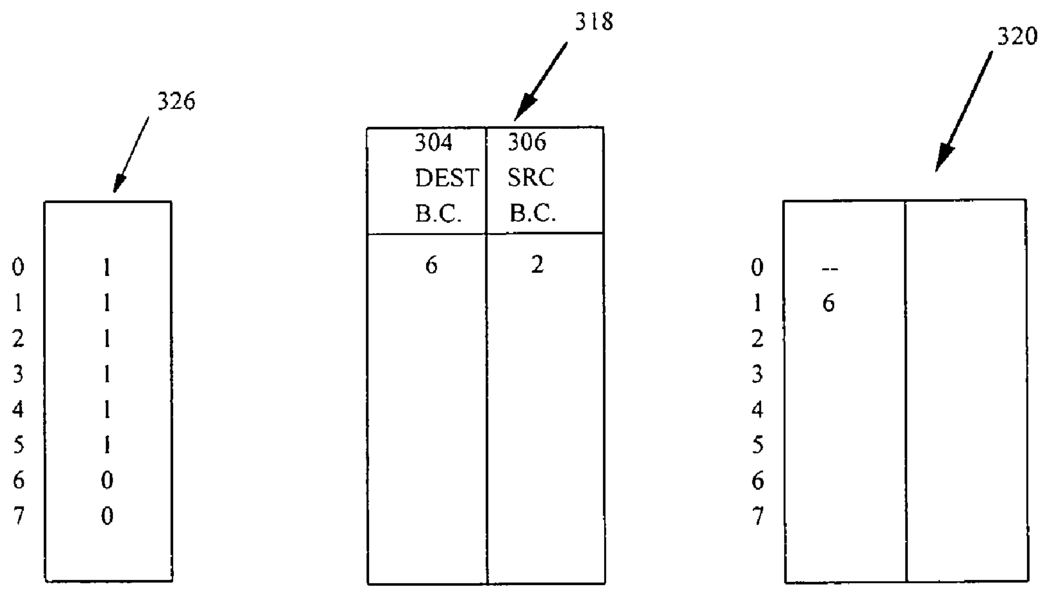
Figure 3H:
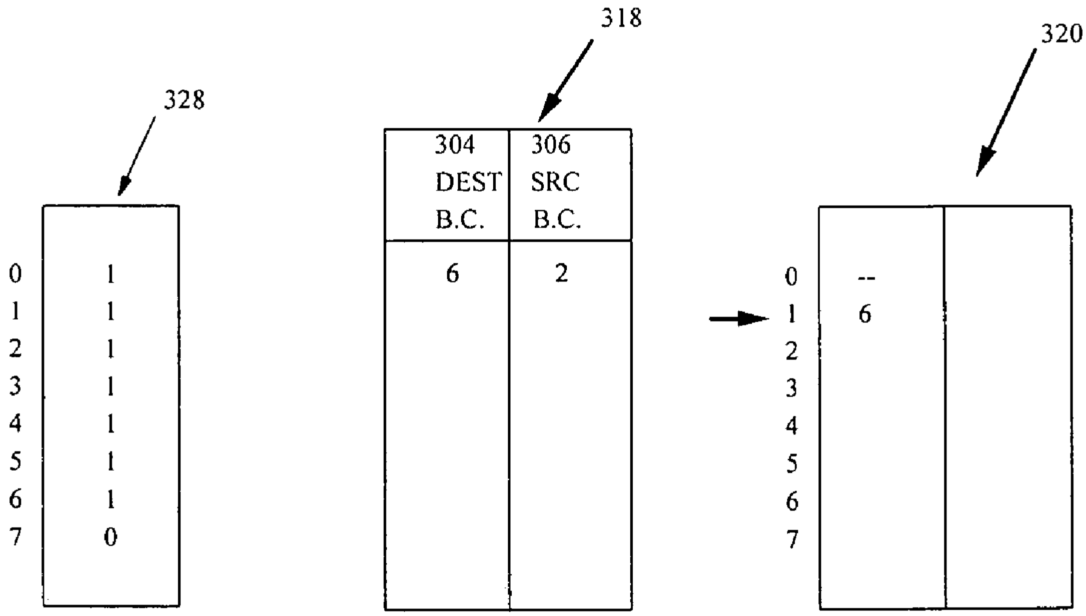
Figure 3I:
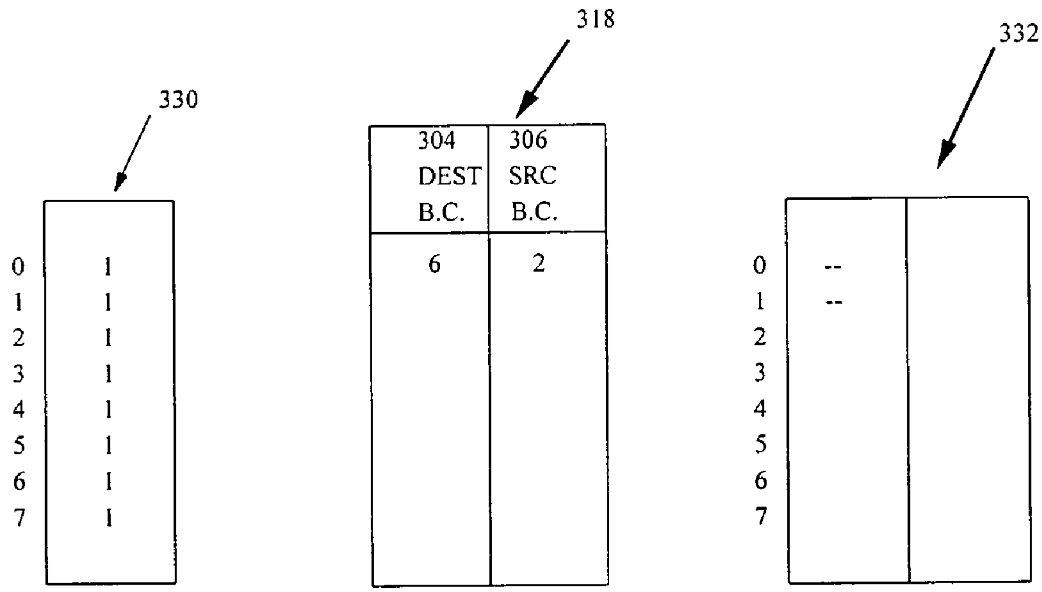

Thus, the processing of the bytecode sequence in FIG. 2, given PC7 as the destination PC, would be performed as follows:

- FIG. 3A: At commencement, there would be only one element, PC 0 in the to be seen list 308.
- FIG. 3B: PC 0 is marked as "seen" in the seen list 310 and removed from the to be seen list 312. A LOAD does not affect the control flow; it is state 0. The stack mapper moves on to the next byte, PC 1.
- FIG. 3C: PC 1 is marked as "seen" in the seen list 314. The byte is again A LOAD, state 0, so the stack mapper moves on to the next PC.
- FIG. 3D: PC 2 ("JSR") is treated in the first pass as a conditional branch. Once PC 2 is added to the seen list 316, its target PC 6 is added to the to be walked list 320 and the branch PC 6 (destination PC 304)/PC 2 (source branch 306) is added to the branch list 318.
- FIG. 3E: The I LOAD of PC 3 is state 0, so the stack mapper moves to the next byte after adding PC 3 to the seen list 324.
- FIG. 3F: PC 4 is a conditional branch. After adding PC 4 to the seen list 326, the stack mapper attempts to add its target, PC 0, to the to be seen list 320, but cannot because PC 0 is already on the seen list 326.
- FIG. 3G: At the return of PC 5, code flow stops (state 4), ending the stack walk after PC has been added to the seen list 328.

At this point, the stack mapper determines whether it has seen the destination PC 7 (as per block 108 in FIG. 1A). Since it has not, the stack mapper begins processing a new line of bytecodes from the next entry on the to be walked list (block 104). According to the sample of FIG. 2, the next PC on the to be walked list 320 in FIG. 3G) is PC 6, the conditional branch from PC 2. Therefore, after marking PC 6 as seen (seen list 330, FIG. 3H), the stack mapper processed the PC according to state 0 and proceeds to the next bytecode, which is PC 7. PC 7 is marked as seen (seen list 332, FIG. 3I), and the walk ends again because it has encountered a fresh return (state 4).

Once the selected PC has been walked (block 108), the path to the destination is calculated in reverse (block 110) by tracing from the destination PC 304 to the source PC 306 on the branch map list. In the example, the reverse flow is from PC 7 to PC 6 to PC 2. Because there is no comparable pairing of PC 2 with any other designated PC, it is assumed that PC 2 flows, in reverse, to PC 0. The reverse of this mapping provides the code flow from the beginning of the method to the destination PC 7, that is:

PC 0->PC 2->PC 6->PC 7.

This is the end of the first pass of the stack mapper over the bytecodes.

In the second pass, the stack mapper creates a simulation of the bytecodes (block 112) during which the stack mapper walks the path through the method determined from the first pass simulating what stack action(s) the virtual machine would perform for each object in this bytecode sequence. For many of the bytecode types (eg., A LOAD), the actions are table driven according to previously calculated stack action (pushes and pops) sequences.

Fifteen types of bytecodes are handled specially, mainly because instances of the same type may result in different stack action sequences (eg., different INVOKES may result in quite different work on the stack).

An appropriate table, listing the table-driven actions and the escape sequences in provided in the Appendix hereto. A virtual stack showing the stack shape up to the selected PC is constructed in memory previously allocated (block 114). In the preferred embodiment, one CPU word is used for each stack element. The virtual stack is then recorded in a compressed encoded format that is readable by the virtual machine (block 116). In the preferred embodiment, each slot is compressed to a single bit that essentially distinguishes (for the use of the garbage collector) between objects and non-objects (eg., integers).

Figure 4:
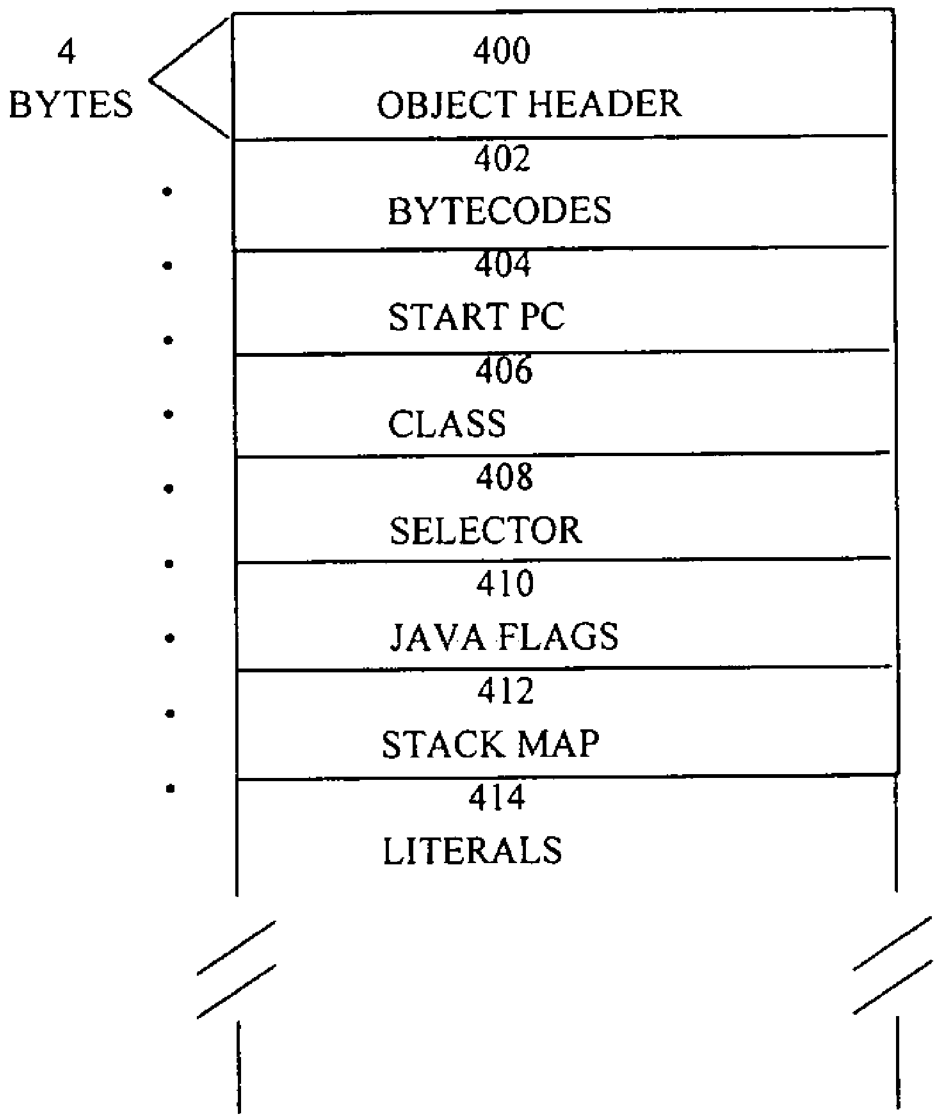
FIG. 4 is a schematic illustration of a compiled method stored on the heap which includes static storage of a stack map generated during compilation of the method.

The compressed encoded stack map is stored statically in the compiled method or on the stack during dynamic mapping. In the case of static mapping, a stack map is generated and stored as the method is compiled on the heap. A typical compiled method shape for a Java method is illustrated schematically in FIG. 4. The compiled method is made up of a number of fields, each four bytes in length, including the object header 400, bytecodes 402, start PC 404, class pointers 406, selector 408, Java flags 410 and literals 414. According to the invention, the compiled method also includes a field for the stack map 412. The stack map field 412 includes an array that encodes the information about the temps or local variables in the method generated by the stack mapper in the manner described above, and a linear stack map list that a garbage collector can use to access the stack shape for a given destination PC in the array by calculating the offset and locating the mapping bits in memory.

A stack map would normally be generated for static storage in the compiled method when the method includes an action that transfer control from that method, such as invokes, message sends, allocates and resolves.

The stack map can also be generated dynamically, for example, when an asynchronous event coincides with a garbage collection. To accommodate the map, in the preferred embodiment of the invention, empty storage is left on the stack.

Figure 5:
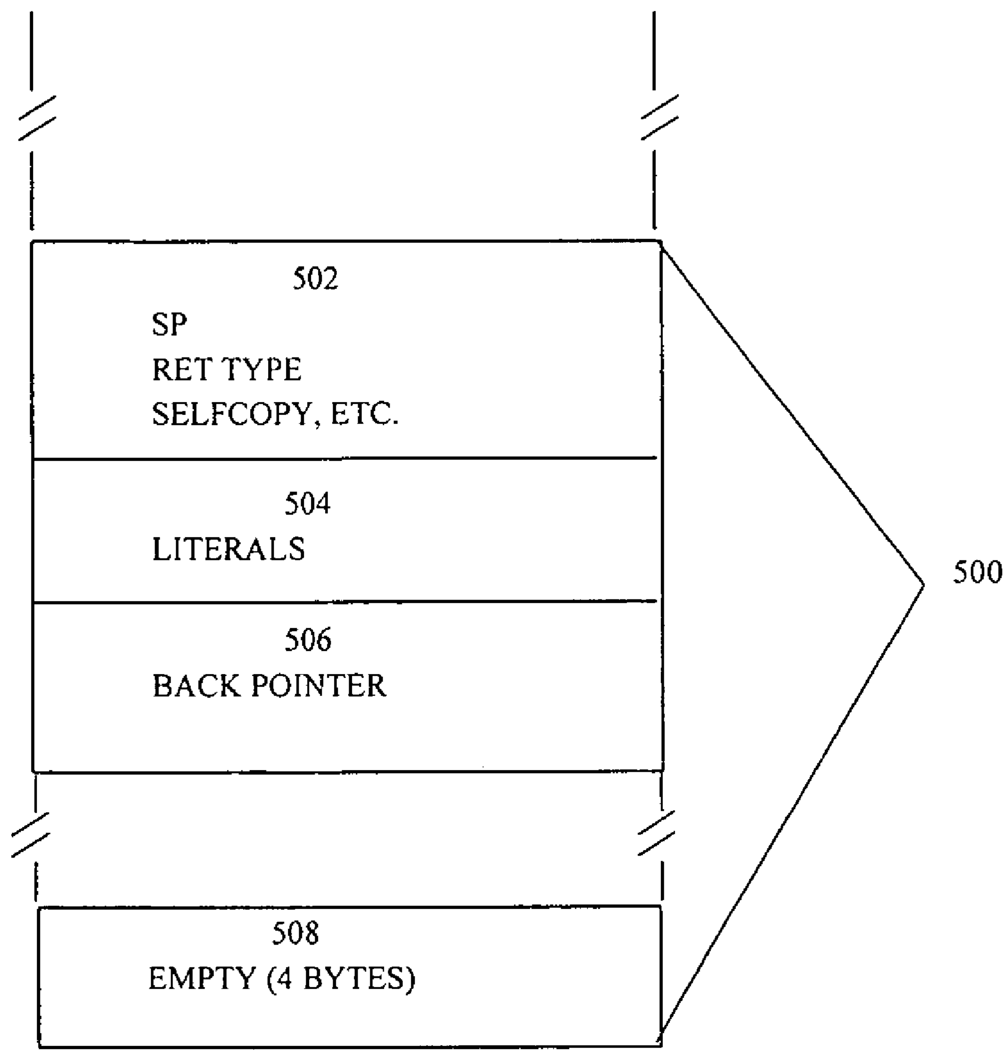
FIG. 5 is a schematic illustration of a stack constructed for a method which provides storage for a stack map generated dynamically at runtime.

FIG. 5 illustrates a stack frame 500, having standard elements, such as an area for temps or arguments pushed by the method 502, literals or the pointer to the compiled method 504 (which also gives access to the stack map in the compiled method) and a back pointer 506 pointing to the previous stack frame. A small area of memory 508, possibly only four bytes, is left empty in the frame but tagged as needing dynamic mapping. An advantage of this is that if this stack frame 500 is deep in the stack once the dynamic mapping has taken place, the frame will be undisturbed and is available for future activations.

The area on the stack for dynamic stack mapping 508 can be allocated whenever a special event occurs such as timer or asynchronous events and debugging, as well as for invokes, allocates and resolves discussed above.

While the invention has been particularly shown and described with respect to preferred embodiments thereof, it will be understood by those skilled in the art that the foregoing and other changes in form and details may be made therein without departing from the spirit and scope of the invention.

APPENDIX

Simulation Action Keys:

o. pop.
u. push int
U. push object
d. dup
1. dupx1
2. dupx2
3. dup2
4. dup2x1
5. dup2x2
s. swap
j. jsr
m. multianewarray
l. ldc
i. invoke (static|virtual|interface|special)
g. get (field/static)
p. put (field/static)

| # | Name | Simulation Action | Walk Action |
|---|---|---|---|
| 0 | nop | ‘ ’ | 0x00 |
| 1 | aconstnull | ‘U’ | 0x00 |
| 2 | iconstm1 | ‘u’ | 0x00 |
| 3 | iconst0 | ‘u’ | 0x00 |
| 4 | iconst1 | ‘u’ | 0x00 |
| 5 | iconst2 | ‘u’ | 0x00 |
| 6 | iconst3 | ‘u’ | 0x00 |
| 7 | iconst4 | ‘u’ | 0x00 |
| 8 | iconst5 | ‘u’ | 0x00 |
| 9 | lconst0 | ‘uu’ | 0x00 |
| 10 | lconst1 | ‘uu’ | 0x00 |
| 11 | fconst0 | ‘u’ | 0x00 |
| 12 | fconst1 | ‘u’ | 0x00 |
| 13 | fconst2 | ‘u’ | 0x00 |
| 14 | dconst0 | ‘uu’ | 0x00 |
| 15 | dconst1 | ‘uu’ | 0x00 |
| 16 | bipush | ‘u’ | 0x00 |
| 17 | sipush | ‘u’ | 0x00 |
| 18 | ldc | ‘l’ | 0x00 |
| 19 | ldcw | ‘l’ | 0x00 |
| 20 | ldc2w | ‘uu’ | 0x00 |
| 21 | iload | ‘u’ | 0x00 |
| 22 | iload | ‘uu’ | 0x00 |
| 23 | fload | ‘u’ | 0x00 |
| 24 | dload | ‘uu’ | 0x00 |
| 25 | aload | ‘U’ | 0x00 |
| 26 | iload0 | ‘u’ | 0x00 |
| 27 | iload1 | ‘u’ | 0x00 |
| 28 | iload2 | ‘u’ | 0x00 |
| 29 | iload3 | ‘u’ | 0x00 |
| 30 | iload0 | ‘uu’ | 0x00 |
| 31 | lload1 | ‘uu’ | 0x00 |
| 32 | lload2 | ‘uu’ | 0x00 |
| 33 | lload3 | ‘uu’ | 0x00 |
| 34 | fload0 | ‘u’ | 0x00 |
| 35 | fload1 | ‘u’ | 0x00 |

-continued

APPENDIX

| | | | |
|---|---|---|---|
| 36 | fload2 | ‘u’ | 0x00 |
| 37 | fload3 | ‘u’ | 0x00 |
| 38 | dload0 | ‘uu’ | 0x00 |
| 39 | dload1 | ‘uu’ | 0x00 |
| 40 | dload2 | ‘uu’ | 0x00 |
| 41 | dload3 | ‘uu’ | 0x00 |
| 42 | aload0 | ‘U’ | 0x00 |
| 43 | aload1 | ‘U’ | 0x00 |
| 44 | aload2 | ‘U’ | 0x00 |
| 45 | aload3 | ‘U’ | 0x00 |
| 46 | iaload | ‘oou’ | 0x00 |
| 47 | laload | ‘oouu’ | 0x00 |
| 48 | faload | ‘oou’ | 0x00 |
| 49 | daload | ‘oouu’ | 0x00 |
| 50 | aaload | ‘ooU’ | 0x00 |
| 51 | baload | ‘oou’ | 0x00 |
| 52 | caload | ‘oou’ | 0x00 |
| 53 | saload | ‘oou’ | 0x00 |
| 54 | istore | ‘o’ | 0x00 |
| 55 | lstore | ‘oo’ | 0x00 |
| 56 | fstore | ‘o’ | 0x00 |
| 57 | dstore | ‘oo’ | 0x00 |
| 58 | astore | ‘o’ | 0x00 |
| 59 | istore0 | ‘o’ | 0x00 |
| 60 | istore1 | ‘o’ | 0x00 |
| 61 | istore2 | ‘o’ | 0x00 |
| 62 | istore3 | ‘o’ | 0x00 |
| 63 | lstore0 | ‘oo’ | 0x00 |
| 64 | lstore1 | ‘oo’ | 0x00 |
| 65 | lstore2 | ‘oo’ | 0x00 |
| 66 | lstore3 | ‘oo’ | 0x00 |
| 67 | fstore0 | ‘o’ | 0x00 |
| 68 | fstore1 | ‘o’ | 0x00 |
| 69 | fstore2 | ‘o’ | 0x00 |
| 70 | fstore3 | ‘o’ | 0x00 |
| 71 | dstore0 | ‘oo’ | 0x00 |
| 72 | dstore1 | ‘oo’ | 0x00 |
| 73 | dstore2 | ‘oo’ | 0x00 |
| 74 | dstore3 | ‘oo’ | 0x00 |
| 75 | astore0 | ‘o’ | 0x00 |
| 76 | astore1 | ‘o’ | 0x00 |
| 77 | astore2 | ‘o’ | 0x00 |
| 78 | astore3 | ‘o’ | 0x00 |
| 79 | iastore | ‘ooo’ | 0x00 |
| 80 | lastore | ‘oooo’ | 0x00 |
| 81 | fastore | ‘ooo’ | 0x00 |
| 82 | dastore | ‘oooo’ | 0x00 |
| 83 | aastore | ‘ooo’ | 0x00 |
| 84 | bastore | ‘ooo’ | 0x00 |
| 85 | castore | ‘ooo’ | 0x00 |
| 86 | sastore | ‘ooo’ | 0x00 |
| 87 | pop | ‘o’ | 0x00 |
| 88 | pop2 | ‘oo’ | 0x00 |
| 89 | dup | ‘d’ | 0x00 |
| 90 | dupx1 | ‘1’ | 0x00 |
| 91 | dupx2 | ‘2’ | 0x00 |
| 92 | dup2 | ‘3’ | 0x00 |
| 93 | dup2x1 | ‘4’ | 0x00 |
| 94 | dup2x2 | ‘5’ | 0x00 |
| 95 | swap | ‘s’ | 0x00 |
| 96 | iadd | ‘oou’ | 0x00 |
| 97 | ladd | ‘oooouu’ | 0x00 |
| 98 | fadd | ‘oou’ | 0x00 |
| 99 | dadd | ‘oooouu’ | 0x00 |
| 100 | isub | ‘oou’ | 0x00 |
| 101 | lsub | ‘oooouu’ | 0x00 |
| 102 | fsub | ‘oou’ | 0x00 |
| 103 | dsub | ‘oooouu’ | 0x00 |
| 104 | imul | ‘oou’ | 0x00 |
| 105 | lmul | ‘oooouu’ | 0x00 |
| 106 | fmul | ‘oou’ | 0x00 |
| 107 | dmul | ‘oooouu’ | 0x00 |
| 108 | idiv | ‘oou’ | 0x00 |
| 109 | ldiv | ‘ooouu’ | 0x00 |
| 110 | fdiv | ‘oou’ | 0x00 |
| 111 | ddiv | ‘oooouu’ | 0x00 |
| 112 | irem | ‘oou’ | 0x00 |

-continued

APPENDIX

| | | | |
|---|---|---|---|
| 113 | lrem | ‘ooouu’ | 0x00 |
| 114 | frem | ‘oou’ | 0x00 |
| 115 | drem | ‘ooooouu’ | 0x00 |
| 116 | ineg | ‘ou’ | 0x00 |
| 117 | lneg | ‘oouu’ | 0x00 |
| 118 | fneg | ‘ou’ | 0x00 |
| 119 | dneg | ‘oouu’ | 0x00 |
| 120 | ishl | ‘oou’ | 0x00 |
| 121 | lshl | ‘ooouu’ | 0x00 |
| 122 | ishr | ‘oou’ | 0x00 |
| 123 | lshr | ‘ooouu’ | 0x00 |
| 124 | iushr | ‘oou’ | 0x00 |
| 125 | lushr | ‘ooouu’ | 0x00 |
| 126 | iand | ‘oou’ | 0x00 |
| 127 | land | ‘ooooouu’ | 0x00 |
| 128 | ior | ‘oou’ | 0x00 |
| 129 | lor | ‘ooooouu’ | 0x00 |
| 130 | ixor | ‘oou’ | 0x00 |
| 131 | ixor | ‘ooooouu’ | 0x00 |
| 132 | iinc | ‘ ’ | 0x00 |
| 133 | i2l | ‘ouu’ | 0x00 |
| 134 | i2f | ‘ou’ | 0x00 |
| 135 | i2d | ‘ouu’ | 0x00 |
| 136 | l2i | ‘oou’ | 0x00 |
| 137 | l2f | ‘oou’ | 0x00 |
| 138 | l2d | ‘oouu’ | 0x00 |
| 139 | f2i | ‘ou’ | 0x00 |
| 140 | f2l | ‘ouu’ | 0x00 |
| 141 | f2d | ‘ouu’ | 0x00 |
| 142 | d2i | ‘oou’ | 0x00 |
| 143 | d2l | ‘oouu’ | 0x00 |
| 144 | d2f | ‘oou’ | 0x00 |
| 145 | i2b | ‘ou’ | 0x00 |
| 146 | i2c | ‘ou’ | 0x00 |
| 147 | i2s | ‘ou’ | 0x00 |
| 148 | lcmp | ‘oooou’ | 0x00 |
| 149 | fcmpl | ‘oou’ | 0x00 |
| 150 | fcmpg | ‘oou’ | 0x00 |
| 151 | dcmpl | ‘oooou’ | 0x00 |
| 152 | dcmpg | ‘oooou’ | 0x00 |
| 153 | ifeq | ‘o | 0x01 |
| 154 | ifne | ‘o | 0x01 |
| 155 | iflt | ‘o | 0x01 |
| 156 | ifge | ‘o | 0x01 |
| 157 | ifgt | ‘o | 0x01 |
| 158 | ifle | ‘o | 0x01 |
| 159 | ificmpeq | ‘oo | 0x01 |
| 160 | ificmpne | ‘oo | 0x01 |
| 161 | ificmplt | ‘oo | 0x01 |
| 162 | ificmpge | ‘oo | 0x01 |
| 163 | ificmpgt | ‘oo | 0x01 |
| 164 | ificmple | ‘oo | 0x01 |
| 165 | ifacmpeq | ‘oo | 0x01 |
| 166 | ifacmpne | ‘oo | 0x01 |
| 167 | goto | ‘ ’ | 0x02 |
| 168 | jsr | ‘j’ | 0x03 |
| 169 | ret | ‘on’ | 0x04 |
| 170 | tableswitch | ‘o’ | 0x05 |
| 171 | lookupswitch | ‘o’ | 0x05 |
| 172 | ireturn | ‘o’ | 0x04 |
| 173 | lreturn | ‘oo’ | 0x04 |
| 174 | freturn | ‘o’ | 0x04 |
| 175 | dreturn | ‘oo’ | 0x04 |
| 176 | areturn | ‘o’ | 0x04 |
| 177 | return | ‘ ’ | 0x04 |
| 178 | getstatic | ‘g’ | 0x00 |
| 179 | putstatic | ‘p’ | 0x00 |
| 180 | getfield | ‘g’ | 0x00 |
| 181 | putfield | ‘p’ | 0x00 |
| 182 | invokevirtual | ‘i’ | 0x00 |
| 183 | invokespecial | ‘i’ | 0x00 |
| 184 | invokestatic | ‘i’ | 0x00 |
| 185 | invokeinterface | ‘i’ | 0x00 |
| 187 | new | ‘U’ | 0x00 |
| 188 | newarray | ‘oU’ | 0x00 |
| 189 | anewarray | ‘oU’ | 0x00 |
| 190 | arraylength | ‘ou’ | 0x00 |

-continued

| APPENDIX | | | |
|---|---|---|---|
| 191 | athrow | 'ou' | 0x04 |
| 192 | checkcast | ' ' | 0x00 |
| 193 | instanceof | 'ou' | 0x00 |
| 194 | monitorenter | 'o' | 0x00 |
| 195 | monitorexit | 'o' | 0x00 |
| 196 | wide | ' ' | 0x06 |
| 197 | multianewarray | 'm' | 0x00 |
| 198 | ifnull | 'o' | 0x01 |
| 199 | ifnonnull | 'o' | 0x01 |
| 200 | gotow | ' ' | 0x02 |
| 201 | jsrw | 'j' | 0x03 |
| 202 | breakpoint | ' ' | 0x07 |

Having thus described our invention, what we claim as new, and desire to secure by Letters Patent is:

1. A method for mapping a valid stack up to a destination program counter, said stack having a layout of instructions for a method including one or more branches, said method comprising:

mapping a path of control flow on the stack from any start point in a selected method to the destination program counter by locating a linear path from the beginning of the method to the destination program counter and iteratively processing an existing bytecode sequence for each branch, and identifying said path as complete when said destination program counter is reached, said mapping including processing a first linear bytecode sequence until the control flow is interrupted;

simulating stack actions for executing said existing bytecodes along said path, and constructing a virtual stack for storage in a pre-allocated memory location; and, recording unprocessed targets from any branches in the first linear bytecode sequence for future processing.

2. The method of claim 1 wherein the step of mapping a path of control flow on the stack further comprises:

processing an additional bytecode linear sequence until the control flow is interrupted; and recording unprocessed targets from any branches in the additional linear bytecode sequence for future processing, where the destination program counter was not reached during an earlier processing of a linear bytecode sequence.

3. The method of claim 2 wherein the step of processing any linear bytecode sequence comprises:

determining if a bytecode in said any linear bytecode sequence is a breakpoint with a pointer to bytecode data; and replacing the breakpoint with the bytecode data.

4. The method of claim 1 wherein the step of processing any linear bytecode sequence comprises:

determining if a bytecode in said any linear bytecode sequence is a breakpoint with a pointer to bytecode data; and replacing the breakpoint with the bytecode data.

5. The method of claim 1, further comprising:

encoding the virtual stack as a bitstring and storing the bitstring at a selected destination for use in memory management operations.

6. The method of claim 5, wherein the step of storing the bitstring comprises storing the bitstring to the selected method as compiled on a heap.

7. The method of claim 5, wherein the step of storing the bitstring comprises storing the bitstring to a pre-allocated area on the stack.

8. The method of claim 2 wherein the step of simulating stack actions executing the bytecodes along the path further comprises:

inserting pre-determined stack actions for bytecodes maintaining the control flow in the selected method; and calculating stack actions for bytecodes transferring the control flow from the selected method.

9. A method for mapping a Java bytecode stack up to a destination program counter, said Java bytecode stack having a layout of instructions for a method including one or more branches, said method comprising:

mapping a path of control flow on the stack from any start point in a selected method to the destination program counter by locating a linear path from the beginning of the method to the destination program counter and iteratively processing an existing bytecode sequence at each branch, and identifying said path as complete when said destination counter is reached, said mapping including processing a first linear bytecode sequence until the control flow is interrupted;

simulating stack actions for executing said existing bytecodes along said path, and constructing a virtual stack for storage in a pre-allocated memory location; and recording unprocessed targets from any branches in the first linear bytecode sequence for future processing.

10. The method of claim 9 wherein the step of mapping a path of control flow on the stack further comprises:

processing an additional bytecode linear sequence until the control flow is interrupted; and recording unprocessed targets from any branches in the additional linear bytecode sequence for future processing, where the destination program counter was not reached during an earlier processing of a linear bytecode sequence.

11. The method of claim 10 wherein the step of processing any linear bytecode sequence comprises:

determining if a bytecode in said any linear bytecode sequence is a breakpoint with a pointer to bytecode data; and replacing the breakpoint with the bytecode data.

12. The method of claim 9 wherein the step of processing any linear bytecode sequence comprises:

determining if a bytecode in said any linear bytecode sequence is a breakpoint with a pointer to bytecode data; and replacing the breakpoint with the bytecode data.

13. The method of claim 9 further comprising:

encoding the virtual stack as a bitstring and storing the bitstring at a selected destination for use in memory management operations.

14. The method of claim 13, wherein the step of storing the bitstring comprises storing the bitstring to the selected method as compiled on a heap.

15. The method of claim 13, wherein the step of storing the bitstring comprises storing the bitstring to a pre-allocated area on the stack.

16. The method of claim 9 wherein the step of simulating stack actions executing the bytecodes along the path further comprises:

inserting pre-determined stack actions for bytecodes maintaining the control flow in the selected method; and calculating stack actions for bytecodes transferring the control flow from the selected method.

17. A computer-readable media having computer readable program code embodied therein for executing a method for mapping a valid stack up to a destination program counter, said stack having a layout of instructions for a method including one or more branches, the computer readable program code configured for executing method steps comprising:

mapping a path of control flow on the stack from any start point in a selected method to the destination program counter by locating a linear path from the beginning of the method to the destination program counter and iteratively processing an existing bytecode sequence for each branch, and identifying said path as complete when said destination program counter is reached, said mapping including processing a first linear bytecode sequence until the control flow is interrupted;

simulating stack actions for executing said existing bytecodes along said path, and constructing a virtual stack for storage in a pre-allocated memory location; and recording unprocessed targets from any branches in the first linear bytecode sequence for future processing.

18. A computer readable media having computer readable program code embodied therein for executing a method for mapping a Java bytecode stack up to a destination program counter, said Java bytecode stack having a layout of instructions for a method including one or more branches, the computer readable program code configured for executing method steps comprising:

mapping a path of control flow on the stack from any start point in a selected method to the destination program counter by locating a linear path from the beginning of the method to the destination program counter and iteratively processing an existing bytecode sequence at each branch, and identifying said path as complete when said destination counter is reached, said mapping including processing a first linear bytecode sequence until the control flow is interrupted;

simulating stack actions for executing said existing bytecodes along said path, and constructing a virtual stack for storage in a pre-allocated memory location; and recording unprocessed targets from any branches in the first linear bytecode sequence for future processing.

19. A program storage device readable by a machine, tangibly embodying a program of instructions executable by the machine to perform method steps for mapping a valid stack up to a destination program-counter, said stack having a layout of instructions for a method including one or more branches, said method steps comprising:

mapping a path of control flow on the stack from any start point in a selected method to the destination program counter and identifying said path as complete when said destination counter is reached; and simulating stack actions for executing existing bytecodes along said path, wherein the step of mapping a path of control flow on the stack comprises:

processing a first linear existing bytecode sequence until the control flow is interrupted; and recording unprocessed targets in a pre-allocated memory location from any branches in the first linear existing bytecode sequence for future processing; and where the destination program counter was not reached during an earlier processing of a linear existing bytecode sequence;

processing an additional existing bytecode linear sequence until the control flow is interrupted; and recording unprocessed targets in said pre-allocated memory location from any branches in the additional linear existing bytecode sequence for future processing.

* * * * *